Sept. 10, 1929.  G. E. SAUER ET AL  1,727,789
AUTOMOBILE HOOD LOCK
Filed April 17, 1928   2 Sheets-Sheet 1
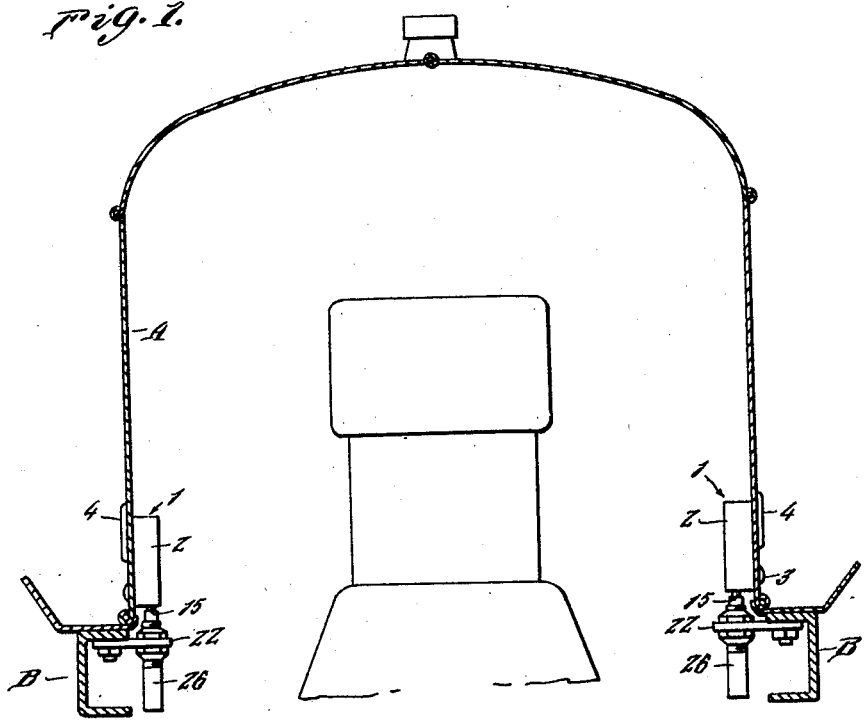
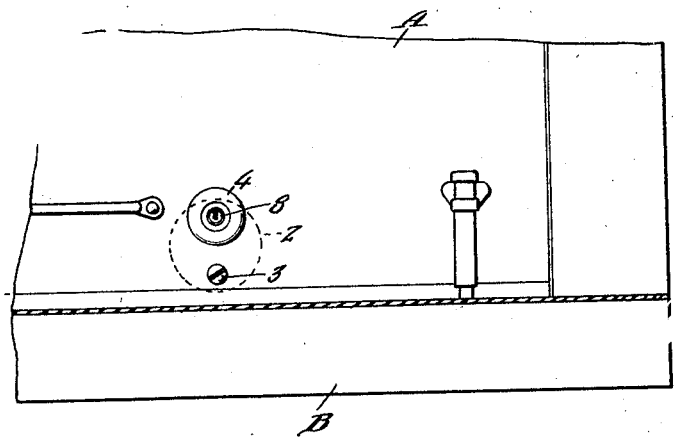
Inventors
George E. Sauer
Otto Lutz
By Clarence A. O'Brien
Attorney

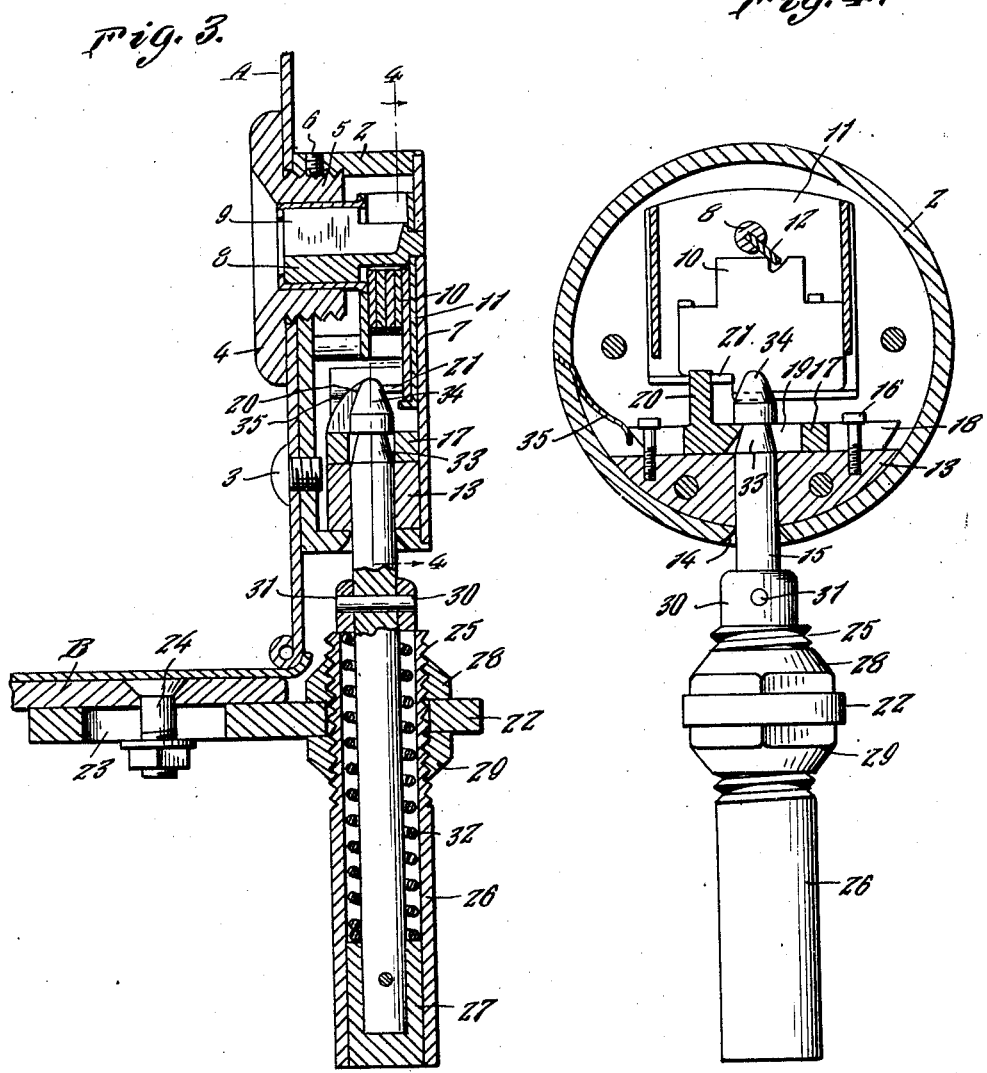

Patented Sept. 10, 1929.

1,727,789

UNITED STATES PATENT OFFICE.

GEORGE E. SAUER AND OTTO LUTZ, OF MILWAUKEE, WISCONSIN.

AUTOMOBILE HOOD LOCK.

Application filed April 17, 1928. Serial No. 270,785.

The present invention relates to improvements in locking devices and has reference more particularly to a simple and efficient means for locking an automobile hood so that unauthorized persons cannot obtain access to the motor.

One of the important objects of the present invention is to provide an automobile hood lock of the above mentioned character that can be readily and easily installed without necessitating any material alterations of the parts of the automobile with which said lock is associated, the same being further at all times positive and efficient in carrying out the purposes for which it is designed.

Still another object of the invention is to provide an automobile lock which is simple in construction, inexpensive, strong and durable.

Other objects of the invention will become apparent as the nature of the invention proceeds and when taken in connection with the accompanying drawings.

In the accompanying drawings, forming a part of this application and in which like numerals designate like parts throughout the several views:

Figure 1 is a vertical sectional view through an automobile hood showing our improved locking means associated therewith.

Figure 2 is a side elevation of a portion of an automobile hood, equipped with the present improvements.

Figure 3 is a vertical sectional view through the lock casing showing the manner in which the slidable latch engages with the headed bolt, the mounting for the bolt being also shown in section.

Figure 4 is a sectional view taken approximately on the line 4—4 of Figure 3, looking in the direction of the arrows, and Figure 5 is a top plan view of the sliding latch showing the T-shaped slot or opening engaged with the upper end of the bolt.

In the drawings, wherein for the purpose of illustration is shown the preferred embodiment of our invention, the numeral 1 designates generally our improved automobile hood lock, the same comprising a circular casing 2, that is open at its rear side. A pair of lock units are provided, one being arranged for each side of the automobile hood A, and as is more clearly disclosed in Figures 2 and 3, the front side of the circular lock casing 2 is secured to the inner side of the vertical wall of the automobile hood A, by the screw 3, that extends through an opening formed in the vertical wall of the automobile hood, the inner end of the screw being threaded into a threaded opening provided therefor in the front closed side of the casing.

The casing of the lock is further secured in a rigid manner to the automobile hood, through the medium of the circular escutcheon plate 4, that engages with the outer face of the vertical wall of the automobile hood A, this escutcheon plate being formed with a central opening from which extends rearwardly a threaded sleeve 5.

The threaded sleeve 5 is disposed through an opening formed in the vertical wall of the automobile hood, and is furthermore threaded through an opening formed in the top portion of the front wall of the lock casing. A set screw 6 is provided for securing the threaded sleeve against displacement from the threaded opening in the front face of the lock casing as is clearly shown in Figure 3.

A removable cover plate 7 is provided for the open rear side of the lock casing and secured to the inner face of this cover plate is the rotatable barrel 8, the forward end of which extends through the sleeve 5 and this barrel is formed with a key receiving slot 9. A series of tumblers 10 are arranged for slidable movement in the frame 11, through which the rotatable cylinder 8 extends and when the key is inserted in the slot 9, said key, which is shown at 12, in Figure 4, will cooperate with the tumblers for actuating the same in the manner to be presently described.

A stationary block 13 is secured in the bottom portion of the lock casing 2, and this block is formed with a central vertical opening that registers with an opening 14 formed in the periphery of the circular casing 2, at the bottom thereof, for accommodating the bolt 15, the specific construction of which will be described in detail. A pair of screws 16 are threaded into the top face of the stationary block 13 adjacent the respective ends thereof and slidable on the upper face of this block is a latch plate 17, the same being of rectangular formation.

The latch plate 17 is formed at its respective ends with slots 18 for cooperation with the screws 16, in the manner as clearly shown in Figure 4.

The intermediate portion of this horizontally disposed sliding latch plate 17 is formed with a key hole slot or opening 19, and the inner or smaller end of this opening is under cut or bevelled as more clearly disclosed in Figure 4.

An upwardly extending shoulder 20 is formed on the top face of this latch plate 17, adjacent one end thereof and cooperating with this shoulder is the lug 21 that extends laterally from the lowermost tumbler 10 whereby said latch plate will be operated when the tumblers are actuated by the insertion of the proper key in the key slot 9 of the rotatable cylinder 8.

The lock further includes the provision of a horizontal disposed bracket 22, that is adjustably secured at its outer end to the respective side of the angle iron frame B of the automobile, the outer end of each bracket being formed with a longitudinal slot 23 through which extends the securing bolt 24, in the manner more clearly disclosed in Figure 3. The inner end of each bracket is formed with a circular opening through which extends the threaded portion 25 of an elongated sleeve or tube 26, which is closed at its lower end by a slidable plug 27.

Suitable lock nuts 28 and 29 are threaded on the threaded portion 25 of the sleeve or tubular member 26, for engagement with the opposite faces of the inner end portion of the bracket 22, whereby said sleeve may be rigidly secured in any vertically adjusted position in the inner end of each bracket. The lower end of the bolt 15 extends downwardly into this sleeve and is secured, at its lower end in the plug 27. A collar 30 is secured on the upper portion of the bolt by the transverse pin 31, and this collar is normally held against the upper end of the sleeve by the action of the coil spring 32, that is arranged within the tubular member 26 and which encircles the intermediate portion of the bolt, one end of the spring being secured to the collar, while the other end is secured to the plug.

The upper portion of the bolt 15 is adapted to extend upwardly through the opening 14 formed in the bottom of the casing 2 and through the registering opening formed in the stationary block 13 and furthermore, the upper end of the bolt projects through the bolt receiving opening 19 formed in the slidable latch plate 17. The upper end of the bolt is formed with a tapered reduced portion 33, and an enlarged head 34 is formed on the extremity of this tapered reduced portion.

A leaf spring 35 is secured in the side of the lock casing 2, at one end, the free end of this spring being in engagement with one end of the slidable latch plate to urge the same into the position shown in Fig. 4.

Thus, the tapered reduced portion 33 of the bolt 15 will be disposed in the smaller end of the key shaped opening or slot 19 and the upper face of the adjacent portion of the latch plate will engage with the bottom face of the enlarged head 34, thereby positively locking each vertical wall of the automobile hood against upward or outward swinging movement.

When the proper key is inserted in the slot 9 of the cylinder 8, it will cooperate with the sliding tumblers 10, whereby to cause the lug 21 to move the shoulder 20 and the slidable latch plate 17 on which said shoulder is formed against the action of the spring 35, so that the latch plate will be moved out of locking engagement with the head 34. The hood A may then be lifted upwardly off of the bolt 15 in order to obtain access to the engine or the other parts of the automobile beneath the hood whenever desired. The spring 32 is for the purpose of relieving some of the tension from the hood and to further maintain the hood in proper position when the automobile travels over a rough road surface.

An automobile hood lock of the above mentioned character can be readily and easily installed without necessitating any material alterations of the parts of the automobile with which the lock is associated, and furthermore said lock will at all times be positive and efficient in securing the automobile hood closed to prevent any unauthorized person from gaining access to the engine or other parts of the automobile located beneath the hood.

The simplicity of our improved locking device enables the parts to be readily and easily assembled and furthermore the lock will not present an unsightly appearance when installed.

While we have shown the preferred embodiment of our invention it is to be understood that minor changes in the size, shape and arrangement of parts may be resorted to, without departing from the spirit of the invention and the scope of the appended claims.

Having thus described our invention, what we claim as new is:

1. A device of the class described including the combination with the hood and frame of an automobile, of locking means for the hood comprising a lock casing secured on the inner side of the vertical portion of the hood, a vertically disposed bolt carried by the frame, the upper end of the bolt being formed with a head and projectable upwardly through the bottom of the casing, a stationary block arranged in the bottom of the casing and through which the upper end of the bolt is adapted to be projected, a slidable latch plate arranged on said block, a spring for normally urging said latch plate into locking engagement with the headed end of the bolt, and key operated means within the casing, for retracting the bolt to permit the opening of the hood, said last mentioned means including a shoulder formed on the latch plate, a tumbler construction mounted for movement in the casing, a lug extending laterally from the tumbler construction for cooperation with the shoulder to retract the latch, a rotatable cylinder mounted in the casing, said cylinder being provided with a slot for receiving the tumbler operating key.

2. The combination with the hood and frame of an automobile, of locking means for the hood comprising a casing secured on the inner side of the vertical portion of the hood, a vertically disposed bolt carried by the frame, the upper end of the bolt being formed with a head adapted to project upwardly through the bottom of the casing, a stationary block arranged in the bottom of the casing through which the upper end of the bolt is adapted to be projected, a latch plate arranged for slidable movement on the upper face of the block, the respective ends of the latch plate being formed with longitudinal slots, headed members extending upwardly from the upper face of the block for cooperation with the slots to guide the slidable latch plate, said latch plate being formed with a central key hole slot through which the headed end of the bolt is adapted to project, a spring for normally urging the latch plate in one direction on the upper face of the block to maintain the lower portion of the key hole opening in the latch plate in locking engagement with the headed end of the bolt, a shoulder projecting upwardly from the latch plate, a tumbler construction mounted for movement in the casing, a lug extending laterally from the tumbler construction for cooperation with the shoulder to retract the latch plate and dispose the larger portion of the key hole opening in alignment with the headed end of the bolt, whereby the lock casing can be lifted upwardly off of the bolt, and a rotatable cylinder mounted in the casing and provided with a key receiving slot, whereby the same may be actuated to operate the tumblers.

In testimony whereof we affix our signatures.

GEORGE E. SAUER.
OTTO LUTZ.